United States Patent Office 3,520,486
Patented July 14, 1970

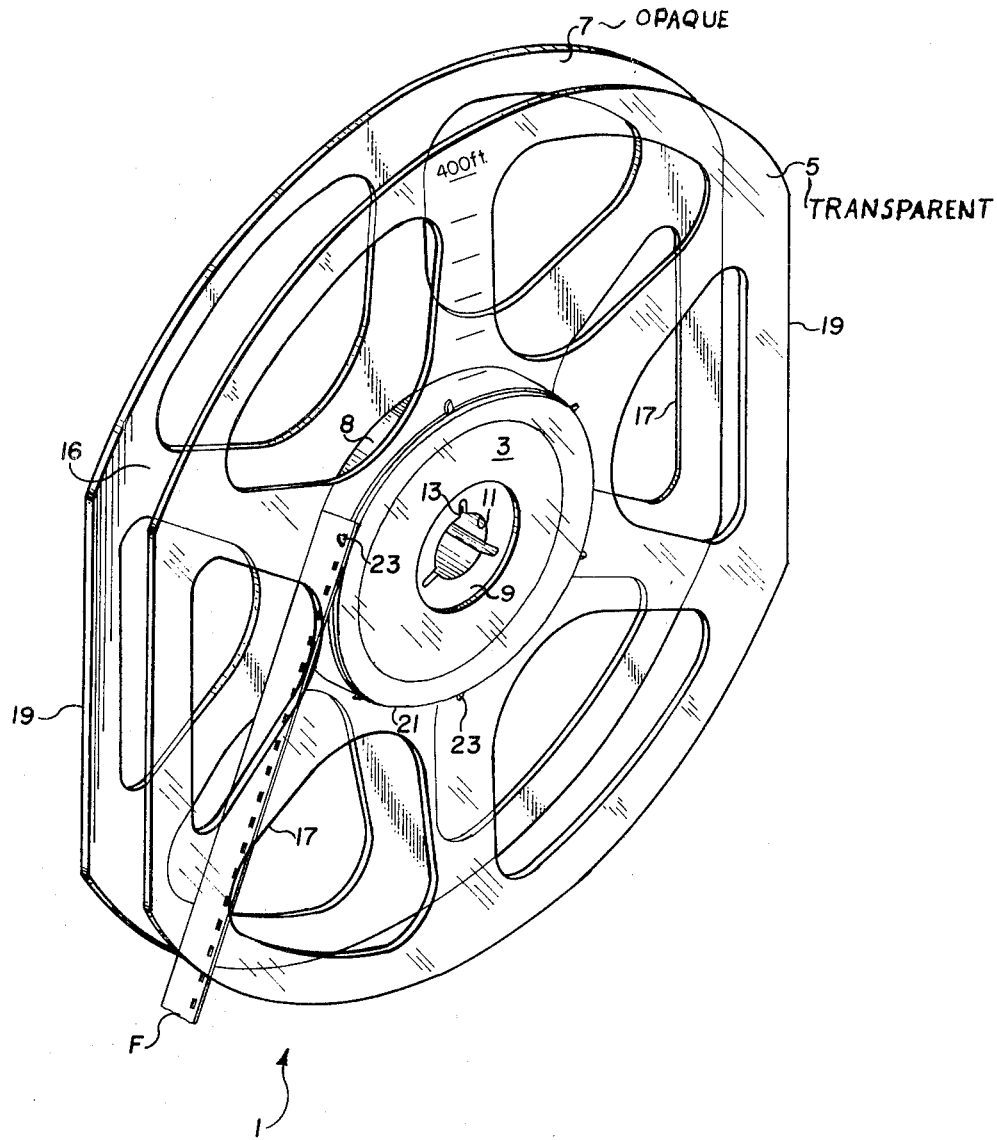

3,520,486
REEL FOR INFORMATION BEARING WEB MATERIAL
Ernst Lieser, Stuttgart-Vaihingen, and Kurt Steisslinger, Stuttgart-Hedelfingen, Germany, assignors to Eastman Kodak Company, Rochester, N.Y., a corporation of New Jersey
Filed Sept. 24, 1968, Ser. No. 761,940
Claims priority, application Germany, Oct. 3, 1967, K 59,009
Int. Cl. B65h 75/28
U.S. Cl. 242—74       2 Claims

ABSTRACT OF THE DISCLOSURE

A film reel for a motion picture projector has a front flange of transparent material and a back flange of opaque material to insure proper positioning (right-way-around) of the reel on the projector and to provide a contrasting background for markings on the front flange.

BACKGROUND OF THE INVENTION

The present invention relates to reels for information bearing web material and more particularly to cine film reels having means for automatically threading film onto a film supporting surface of the reel.

The invention has particular utility in reels of the type disclosed in commonly assigned U.S. Pat. No. 3,298,625, entitled Takeup Reel for Motion Picture Projector, issued Jan. 17, 1967, in the name of D. L. Babcock. Reels of this type generally comprise a supporting portion or hub and two film-guiding flanges extending radially outwardly from the hub at the ends thereof. In order to automatically thread film onto the reel, the hub of the reel is provided with a circular ring or band having a plurality of teeth projecting therefrom adjacent one of the flanges. These teeth engage the film and enter perforations along one side of the film as the film is directed by the projector into contact with the reel hub. Because the film for which the reel is designed has perforations only on one side, the film engaging teeth are adjacent only one side of the hub. It is therefore necessary to the satisfactory operation of the reel that the reel be mounted on the projector in the proper manner (right-way-round) such that the teeth will be on the same side of the hub as the film perforations.

Previously known reels of this type have been constructed of metal or plastic with both flanges either opaque or transparent, and certain of these reels have been provided on one or both reel flanges with appropriate directions, color symbols or the like, to indicate the proper manner for mounting the reel on the projector. However, despite such directions, color symbols or the like, it frequently happens that reels are mounted incorrectly on the projector with the film engaging teeth on the side opposite from the film perforations. This is not only time-consuming and annoying, but may even entail more serious consequences such as damage to the film and parts of the projector apparatus.

SUMMARY OF THE INVENTION

It is an object of the present invention to provide a film reel for a motion picture projector, which reel has features making the proper orientation for mounting the reel on the projector immediately apparent to the user even absent special directions on the reel.

It is a further object of the invention to provide a reel having an opaque flange, and a transparent flange through which film on the reel hub and markings on the transparent flange will be clearly visible against the background contrast of the opaque flange.

It is known in the art to make both flanges on a reel transparent to assist orientation by making the receiving surface on the hub more visible. The remarkable thing about this invention is that the proper orientation is much more likely if the operator uses a reel with only one flange transparent.

In a disclosed embodiment of the invention, a self-threading film reel is provided with a front flange of transparent plastic material and a back flange of opaque plastic material, to insure proper positioning of the reel on the projector and to provide a contrasting background for film on the reel and markings on the front flange.

BRIEF DESCRIPTION OF DRAWING

The drawing is a perspective view of a duo-flanged reel in accordance with the invention illustrating a front flange of transparent material and a back flange of opaque material.

DETAILED DESCRIPTION OF PREFERRED EMBODIMENT

Referring to the drawing, a preferred embodiment of the invention is disclosed comprising a film reel 1 having a film supporting portion or hub 3 and front and back parallel flanges 5 and 7, respectively, extending radially outwardly from the hub at first and second opposite ends thereof.

Hub 3 includes a surface 8 for supporting film on the reel and means for supporting the reel on a projector spindle; such means preferably comprising a core 9 defining a bore 11 concentric with hub 3, and three radially oriented slots 13 extending from the bore at equally spaced locations about the bore circumference. Bore 11 has an inside diameter slightly larger than the outside diameter of a projector spindle and is adapted to receive the spindle (not shown) with a detent driving means (not shown) on the spindle received in one of the slots 13 to drivably support the reel on the projector.

Flanges 5 and 7 are generally disk shaped and are axially spaced on hub 3 by an amount equal to or slightly greater than the width of film to be supported by the hub, to define the lateral boundaries of a film winding and storing space 16 between the flanges. Each flange is provided with voids or spaces 17 extending entirely through the flange walls, and also with corresponding flattened segments 19 on the otherwise circular periphery of the flange. In this manner, material from which the reel is manufactured may be conserved, and film on the reel can easily be grasped to manually thread film onto the reel or to unwind film from the reel. Moreover, flattened segments 19 permit storage of the reel in a small rectangular space such as the cover of a movie projector, without necessarily diminishing the film receiving capacity of the reel.

As is more fully described in aforementioned U.S. Pat. No. 3,298,625, hub 3 is provided on one side of the hub and adjacent one of the flanges with an annular band or ring-shaped member comprising a clutch 21 having a plurality of film engaging teeth 23 extending radially outwardly from the clutch and beyond the film supporting surface 8 of hub 3. Clutch 21 is supported on the reel for rotation with respect thereto and will rotatably slip with respect to the hub when film is fed onto the hub at a linear velocity which is less than the rotational velocity of the film supporting surface of the hub.

Referring now more specifically to the present invention, one of the reel flanges, disclosed in the preferred embodiment as the front flange 5, is constructed from a transparent material, such as clear plastic, while the other of the reel flanges is constructed from opaque material, such as plastic having a "dyed-in" opaque color. The film winding and storing space 16 and the reel elements within this space, such as clutch 21 and teeth 23, are clearly visible through the transparent front flange 5 and visually stand out against the contrast of the opaque background of the back flange 7. Consequently, the proper manner for mounting the reel on the projector can easily be ascertained as the reel is positioned on the projector spindle. Moreover, as the film is threaded onto the reel, the perforated side of the film will be clearly visible to indicate whether the reel is mounted properly and whether the film is properly threaded onto the reel. Thus, the proper orientation of the reel on the projector can be determined without the need for symbols or words such as "front side," "this side out" and the like, which are particularly undesirable when the reels are to be supplied to countries speaking different languages.

The front or transparent flange may also be imprinted with the name of the reel manufacturer or with technical information, film footage or the like, and this information will stand out against the contrast of the back or opaque flange 7. Similarly, film within the confines of the reel flanges will be clearly visible during manual threading of the film onto the reel or pulling of the film from the reel.

The invention has been described in detail with particular reference to the preferred embodiment thereof, but it will be understood that variations and modifications can be effected within the spirit and scope of the invention.

We claim:
1. A takeup reel for supporting film having two edges with perforations along one of said edges on a motion picture projector having means for directing the film into winding relationship with said reel, said reel comprising:
 (a) a hub member having an outer surface for supporting the film on said reel and a core portion for supporting said reel on the projector, said hub member having first and second ends;
 (b) teeth on said hub member adjacent to said first end for engaging the film through the perforations therein to thread the film onto said film supporting surface of said hub member when the film is directed into winding relationship with said reel; and
 (c) first and second spaced flanges extending radially outwardly from said hub member adjacent to said first and second ends, respectively, said first flange being transparent and said second flange being opaque to provide a visual means for orienting said reel relative to the projector so that said teeth are in alignment with the film perforations as the film is directed by the projector into winding relationship with said reel.

2. The takeup reel claimed in claim 1 wherein said first and second flanges have generally circular outer peripheral portions with opposed flat segments to facilitate storage of said reel.

References Cited

UNITED STATES PATENTS

| | | | |
|---|---|---|---|
| 2,004,608 | 6/1935 | Howell | 242—74.2 |
| 2,868,473 | 1/1959 | Hoisington | 242—74.2 |
| 3,298,625 | 1/1967 | Babcock. | |

NATHAN L. MINTZ, Primary Examiner